April 21, 1964 A. F. MANZ 3,130,295
ELECTRIC ARC WORKING PROCESS AND APPARATUS
Filed July 19, 1961 2 Sheets-Sheet 1

INVENTOR.
AUGUST F. MANZ
BY Barnwell P. King
ATTORNEY

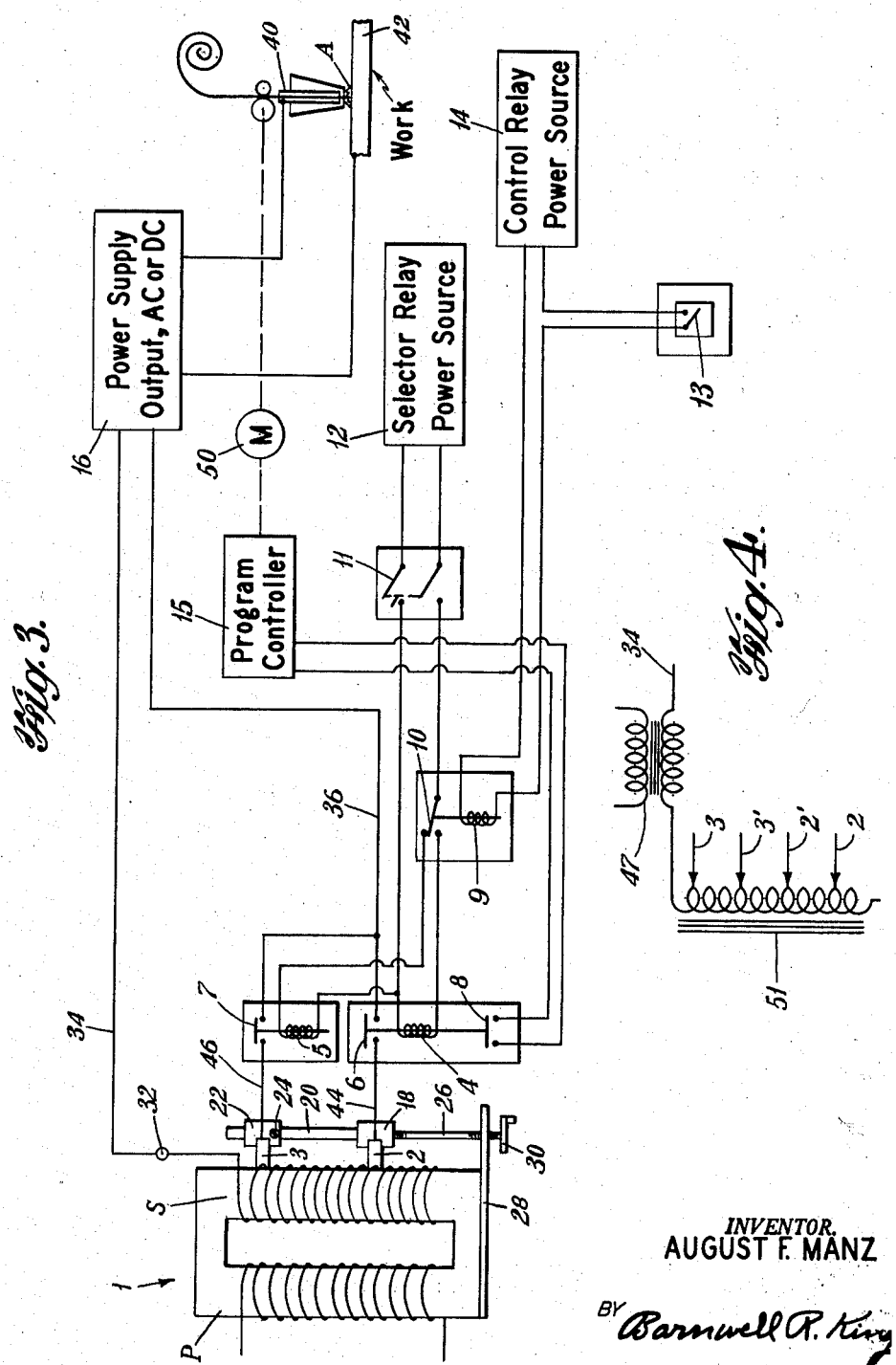

United States Patent Office 3,130,295
Patented Apr. 21, 1964

3,130,295
ELECTRIC ARC WORKING PROCESS
AND APPARATUS
August F. Manz, Newark, N.J., assignor to Union
Carbide Corporation, a corporation of New York
Filed July 19, 1961, Ser. No. 125,250
7 Claims. (Cl. 219—131)

This invention relates to electric arc working, and more particularly to power supply systems therefor.

The invention provides a novel arc power supply system comprising the combination with an A.C. transformer or reactance coil in the main power supply circuit. Such coil is provided with adjustable contacts, and switching circuits associated therewith whereby the operator can select the desired volt-ampere power output for energizing the arc to suit various required conditions depending upon the type of arc working being performed.

More particularly the invention resides in the use of two or more sets of sliding brushes in either a voltage transformer or a reactance member of an arc welding power supply of the type in which control of the arc v.-a. power output is achieved by adjusting either the turns ratio of the transformer or the number of windings in the reactance member. Such sets of sliding brushes, together with the control circuitry are used to program arc welding conditions at the discretion of the welding operator.

In consumable electrode, electric arc welding difficulty frequently arises in obtaining sufficient arc heat to produce sound, fully-penetrated welds at critical locations along the weld. Instances in which such problem may occur are as follows:

(1) At the weld start where the metal surrounding the weld is still cold and is not at a stable temperature.

(2) When tying one weld into another, or when crossing over another weld, where the metal reinforcement of the previously made weld tends to chill the one being made.

(3) At any point where variations, or complexities of the weld joint result in a localized increase in the mass of metal in the immediate vicinity of the weld which tends to chill the weld.

Such problems occur to a greater or lesser extent according to the particular welding conditions used, material, and joint design. In a majority of cases, the difficulty is not serious, and requires no special techniques or procedures in order to obtain the required weld quality. In other cases, however, the problem may be so severe as to cause rejection of the particular welding process involved.

One type of consumable electrode electric arc welding where this is especially troublesome is in short circuiting type metal transfer. Since the advent of such welding process, industry has sought a welding power supply incorporating some means for delivering a controlled amount of additional power in the localized areas where an increase of arc heat is needed.

A few power supplies capable of providing temporary additional power do exist, but they either offer only a partial solution or are not suitable for short circuiting type metal transfer. For example, power supplies using a magnetic control, such as saturable reactors, can be readily modified to provide two or more welding conditions, each of which can be selected independently from the others. When such a power supply is operated with a consumable wire drive system, the wire drive can be programmed along with the power supply so that a preset wire feed speed can be selected in conjunction with each welding condition. Such concept of providing several pre-selected welding conditions from a single power supply has been employed in the past with both conventional (drooping v.-a. characteristic) and constant potential power supplies having magnetic control circuits.

Conventional power supplies, however, are not satisfactory for short circuiting type metal transfer welding, because their short circuit current is insufficient to re-ignite an arc after each short circuit. Constant potential power supplies with magnetic controls, on the other hand, are not desirable for operation with short circuit type metal transfer, because the response of the magnetic control circuit to changes in the power setting is not fast enough to give adequate control.

Welding power supplies of the type in which current control is achieved by changing either the turns ratio of a transformer, or the number of turns on a reactance member, by some mechanical means such as sliding contacts or a series of taps, have a response which is inherently faster than power supplies having magnetic current control circuits. Constant potential power supplies which depend on mechanically changing the transformer turns ratio, or reactance member windings, are ideally suited not only for short circuit type metal transfer welding, but also spray type metal transfer welding. Such power supplies, however, do not lend themselves readily to modification for providing a multiple set of welding conditions.

The principal object of this invention is to provide an arc power supply system in which two or more arc welding v.-a. conditions can be pre-selected at will and maintained as long as desired for consumable electrode electric arc welding with either short circuit type metal transfer or spray type metal transfer.

Another object is to provide such a system provided with means whereby two or more preset arc welding v.-a. conditions can be selected at will and maintained for as long as is desired for non-consumable electric arc welding.

More particularly, the object of this invention is to provide both constant current and constant potential power supplies having mechanical current controls, which alter the transformer turns ratio or the number of windings on a reactance member, with means whereby any one of multiple set of v.-a. welding conditions is made selectively available to the welding operator.

Still another object is to provide a system including means of programming an arc welding operation wherein a particular predetermined sequence of different welding conditions are utilized during the operation.

In the drawings:

FIG. 3 is a circuit diagram of an arc welding system illustrative of the invention; and FIG. 4 is a fragmentary circuit diagram of a modification.

Figure 1:
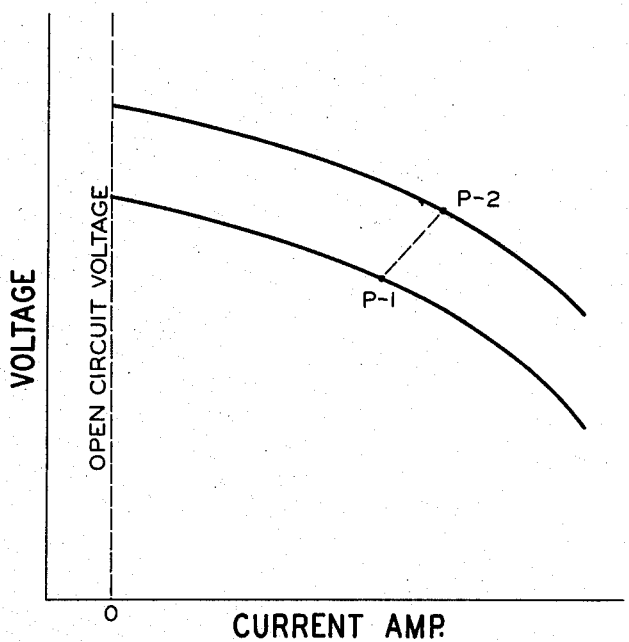
FIGS. 1 and 2 are voltage-current characteristic curves of constant voltage and controlled slope arc power supply systems.

Referring to FIG. 3, there is provided an electric arc welding power supply system comprising, for example, an A.C. transformer 1, the primary of which is P connected to a 460 volt power source in the case of single phase. The secondary S is provided with a plurality of sliding contact brushes 2 and 3 which are mechanically linked or coupled for adjustment simultaneously with respect to the transformer winding S, and for spatial adjustment with respect to one another. For such purpose the brush 2 is provided with a holder 18 of insulating material to which is connected one end of a connecting rod 20. Such rod passes through a hole in the brush holder 22 of brush 3. Such holder 22 is provided with a set screw 24 for securing the brushes 2 and 3 in adjusted spaced-positions with respect to each other. The holder 18 is threaded to a screw 26 that is carried by the transformer frame 28 for rotary but not axial adjustment of such screw through handle 30 simultaneously to adjust brushes 2 and 3 with respect to the transformer winding S.

Thus, adjustment of brush 3 with respect to the output terminal 32 of the transformer 1 determines the voltage output across output leads 34 and 36 connected to the device 16, which in the case of D.C. arc working preferably is a full wave rectifier. This provides a desirable condition for working, such as welding, with a D.C. arc A energized between the end of an electrode 40 and the work 42. Since, for example, such voltage output may not be suitable for starting the arc in the case of short-circuiting type metal transfer-consumable electrode arc welding, adjustment of brush 2 with respect to brush 3, provides a suitable voltage output across leads 34 and 36 for such purpose. Also, when the handle 30 is turned to adjust the position of brush 3 for a desired different voltage output, the brush 2 is simultaneously adjusted to increase the output voltage for arc starting by the same relative increment.

Lead 36 is connected to brush 2 and brush 3, respectively, through branch conductors 44 and 46 provided with normally open relay contacts 6 and 7 of brush selector relays 4 and 5.

In a constant potential power supply which is fitted with a set of sliding brushes, or contacts, in the primary or secondary of the power transformer for the purpose of adjusting output voltage, one or more additional sets of brushes may be added in order to program the welding conditions as required. Transfer from a one set of brushes to a second set causes the welding condition to change. Actually, the operating point is moved from one static characteristic curve for the power supply to a different static characteristic curve of the same family or slope, but of different open circuit voltage. This is shown in FIG. 1.

Point P-1 is an operating condition when using the first set of brushes. On transferring to the second set of brushes, the operating condition moves to point P-2.

On other constant potential power supplies which incorporate in series with the secondary of a transformer 47, a variable reactor 51, FIG. 4, for control of slope, the invention may be utilized in two ways. First, it may take the form described above for constant potential power supplies not having the slope reactor. Secondly, the additional welding conditions required may be obtained by providing additional sets of sliding brushes, or contacts 2', 3', on the sliding brush mechanism of the slope reactor. In such form, when transferring welding from the first set of brushes to the second set, the welding condition is changed by altering the slope of the static characteristic curve while maintaining the same open circuit voltage.

Figure 2:
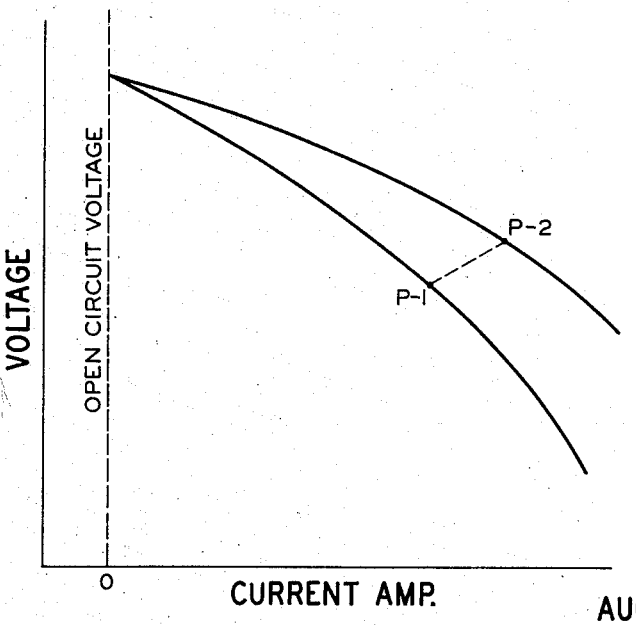

This is shown in FIG. 2. Point P-1 is the operating condition while using the first set of brushes. On transferring to the second set of brushes, the operating condition moves to point P-2.

Constant current power supplies have no voltage adjustment mechanism, and in such case the present invention takes the form of additional sets of sliding brushes to change the number of windings in the reactance member. With conventional power supply operation, transfer from one set of brushes to another changes the welding condition in the same way it is accomplished in constant potential power supplies in which the additional sliding brushes are located in the slope reactor. Thus, the operating points, P-1 and P-2, shown with the volt-ampere characteristic curves in FIG. 2, apply equally well to constant current power supply.

FIG. 3 is a schematic diagram of the invention in a typical constant potential power supply incorporating a variable slope reactor. In this particular case, the additional set of brushes are shown located in the voltage adjustment circuit rather than in the slope reactor. For simplicity purposes, a single phase power supply is shown.

The invention also applies to power supplies having more than one phase. For a multiple phase machine, the additional set of sliding brushes would be provided to each phase of the voltage-adjustment transformer.

At a given instant during the welding operation, with the operator's control switch 13 open (the position shown in FIG. 3) control relay 9 is not energized. Contacts 10 of control relay 9 are spring loaded to hold them in a normally closed position when control relay 9 is not energized. Contacts 10 of control relay 9 serve, at the same time, to operate the circuit to brush selector relay 4, which is thus de-energized. When relay power switch 11 is closed, a circuit is completed to energize brush selector relay 5 from selector relay power source 12. When brush selector relay 5 is energized, its normally open contacts 7 are closed, completing the circuit through sliding brush 3 from voltage transformer 1 to the power supply output 16.

The relative position of sliding brush 3 along the axis of voltage transformer 1, which can be manually set before welding, determines the turns ratio of voltage transformer 1, and thus, in turn, the voltage output at the arc A. Normally open contacts 6 of brush selector relay 4 remain open, thus isolating sliding brush 2 electrically from the circuit, and eliminating the possibility of a short circuit between sliding brush 2 and sliding brush 3, through the windings of a voltage transformer 1. In addition, normally open contacts 8 of brush selector relay 4 are open, so that program controller 15 can provide control of various other welding parameters which are preset to be appropriate to a particular welding condition.

When the welding operation progresses to the point where it is desired to program the welding condition to a new operating point, the operator closes the operator's control switch 13. This completes the circuit to control relay 9 which is energized by control relay power source 14. Contacts 10 of control relay 9 open and a circuit is completed through relay power switch 11, which energizes brush selector relay 4 from selector relay power source 12. Normally open contacts 6 of brush selector relay 4 are closed completing the circuit through sliding brush 2 from voltage transformer 1 to power supply output transformer 16. At the same time, however, the circuit through sliding brush 3 is broken as contacts 10 of control relay 9 open, de-energizing brush selector relay 5, allowing normally open contacts 7 to open.

Thus, sliding brush 3 no longer determines the turns ratio of voltage transformer 1, and sliding brush 2 cannot be short circuited throuhg sliding brush 3. Sliding brush 2 now provides a new turns ratio which was set before welding by the relative placement of sliding brush 2 along the windings of voltage transformer 1. This new turns ratio causes a change in the output of the power supply to produce the desired welding condition. Simultaneously, as brush selector relay 4 was energized, its normally open contacts 8 closed imparting a signal to program controller 15. Where desired, this signal can be used to program other welding variables in order to keep them consistent with the new welding condition.

If it is desired to return to the original welding condition, the operator has only to open the operator's control switch 13. The same sequence of events described above repeats itself, but in the opposite order. Operation of the operator's control switch 13 will alternately select the welding condition determined by the relative placement of sliding brushes 2 and 3 respectively, on voltage transformer 1.

By providing additional sliding brushes, additional brush selector relays, additional sets of contacts on control relay 9, and additional contacts on the operator's control switch 13, it is possible for an operator to select more than two preset welding conditions.

With the inventive device consumable electrode short circuit type metal transfer welds were made in carbon steel with v.-a. welding conditions programmed to provide a hot start. A Linde SVI 300 ampere, 40 volt power supply was provided with an additional set of brushes in each phase of the secondary windings of the voltage adjustment transformer. In addition to controlling the power supply output, the speed of the wire feed motor was programmed to match the wire burn-off rate with each operation condition.

*Typical Welding Conditions*

| | |
|---|---|
| Shielding gas | 15 c.f.h. of a mixture of 75% argon and 25% $CO_2$. |
| Welding wire | 0.030 in. diameter Oxweld #65. |
| Arc v.-a. condition for welding | 21 to 22 volts at 140 amperes. |
| Arc v.-a. condition for starting | 18 volts at 100 amperes. |

The operator was able to select either the starting or welding condition and maintain it as long as desired before transferring to the other. With such v.-a. conditions, a satisfactory weld was produced which exhibited full penetration even at the start.

The program controller 15 may be used to control one or more of the following: the speed of the wire feed motor, the arc shielding gas mixture and/or flow rate, the speed traverse along the seam, and flux flow rate in the case of gas borne flux-shielded systems.

In many applications of consumable electrode electric arc welding using the inventive power supply it is desirable to program the wire feed rate along with the output of the power supply. This is often necessary in order to provide a new wire feed rate to match the new wire melt rate which may be associated with the new volt-ampere operating characteristic of the power supply when its output is programmed. This programming of the wire feed rate is accomplished by means of the program controller 15 operating in conjunction with the electronic governor controlled wire feed motor 50.

For example, when the power supply output is programmed by energizing brush selector relay 4 and de-energizing brush selector relay 5 by means of the circuitry previously described, contacts 8 of brush selector relay 4 close completing a circuit in program controller 15. This, in turn, produces an output from program controller 15 which is sent to wire feed motor 50 altering its speed accordingly and thus the feed rate of the welding electrode 40.

In a typical welding test using the inventive power supply and program controller 15 to program the wire feed rate, welding conditions are as listed in the table above. The wire feed rates for the starting and welding conditions are as listed below:

| | I.p.m. |
|---|---|
| Wire feed rate for starting | 340 |
| Wire feed rate for welding | 230 |

It will be understood that both the A.C. energized reactance and transformer may be provided with taps both individually and simultaneously adjustable according to the invention for the purpose of presetting the slope as well as the maximum voltage of the output which is either A.C. or D.C.

The term "adjustable taps or brushes" as used herein refers to taps or brushes that are adjustable with respect to one another on the coil as distinguished from the fixed settings of the prior art, as in British Patent No. 852,263, dated October 26, 1960, for example. With my novel arrangement precise adjustment of the v.-a. characteristic is possible. As a result optimum welding conditions over the whole welding range are obtained. This was not possible prior to the present invention.

The invention thus provides an arc energizing system for "Heliarc" and SIGMA welding, especially short-circuiting type consumable electrode gas-stream shielded work-in-circuit arc welding, provided with a coil, such as a transformer winding or reactance coil, having associated therewith taps or brushes that are adjustable with respect to one another on the coil for precisely preselecting at least two volt-ampere conditions, such as those best for starting and operating arc-welding. Such adjustable taps or brushes are connected in a switching system by means of which the operator or an automatic control can switch from one of such preselected v.-a. welding condition to another without changing the positions of such taps or brushes.

What is claimed is:

1. In an arc working system requiring different volt-ampere conditions therefor, an A.C. energized power supply circuit for energizing the arc with a plurality of preselected volt-ampere conditions and a relay-switching circuit for selectively operating said A.C. energized power supply circuit to produce any one of such conditions, said power supply circuit comprising an A.C. energized coil provided with a plurality of taps which are adjustable for setting such conditions, means for individually adjusting said taps with respect to such coil, and means for adjusting said taps simultaneously with respect to said coil without affecting their relative adjustment with respect to one another.

2. A system as defined by claim 1, in which said coil comprises a reactance.

3. A system as defined by claim 1 in which said coil comprises a transformer.

4. An electric arc power supply system comprising the combination with an A.C. energized coil in the main power supply circuit, provided with at least two adjustable contacts for presetting a plurality of different voltage-current characteristics of arc power output, means for separately adjusting said contacts with respect to said coil, and a switching circuit connected to such coil and contacts for selecting a desired voltage-current characterstic of the arc power output of said system depending upon the setting of such contacts.

5. An electric arc power supply system comprising the combination with an A.C. energized coil in the main power supply circuit, provided with at least two adjustable contacts for presetting a plurality of different voltage-current characteristics of arc power output, means for simultaneously adjusting said contacts with respect to said coil, and a switching circuit connected to such coil and contacts for selecting a desired voltage-current characteristics of the arc power output of said system depending upon the setting of such contacts.

6. A programmed arc welding system comprising, in combination, an arc welding device including a wire electrode feed motor for feeding a wire electrode toward an arc drawn between the end of such wire electrode and the work being welded, a welding program controller operatively associated with said wire feed motor for controlling the speed of such motor, an A.C. energized power source for energizing such arc comprising an arc power supply output circuit selected from the class consisting of A.C. and D.C. in series circuit relation with such work and the end of said wire electrode, said A.C. energized power source including a coil provided with a plurality of adjustable taps for controlling the v.-a. characteristic and voltage applied to said arc depending upon the setting of said taps, circuits including relay contacts for connecting any selected one of said taps electrically in said power supply output circuit and simultaneously operating said program controller to energize said feed motor to alter the wire electrode feed rate to correspond with the selected v.-a. characteristic and voltage applied to the arc.

7. A machine for arc working comprising circuit means including a timer having contacts connected in a circuit including a transfer relay having four sets of contacts associated therewith; two sets of said transfer relay contacts being normally closed and the other two sets of said transfer relay contacts being normally open, said normally closed contacts being connected in circuits including an arc power supply and means for adjusting one set of arc voltage and arc current values; and the normally open contacts being connected in circuits including such arc power supply and additional means for adjusting another set of arc voltage and arc current values, so that when said timer times out the circuit to said transfer relay is closed and the contacts associated therewith operate to open the circuit including means for adjusting such one set of voltage and arc current values and to close the circuit including such means for adjusting such other set of arc voltage and arc current values to thereby change the arc voltage and arc current set of values from one to another.

References Cited in the file of this patent

UNITED STATES PATENTS

| | | |
|---|---|---|
| 2,214,868 | Welch | Sept. 17, 1942 |
| 2,322,709 | Owen | June 22, 1943 |
| 2,786,160 | Bichsel | Mar. 19, 1957 |
| 2,960,626 | Mulder | Nov. 15, 1960 |